Patented Oct. 7, 1930

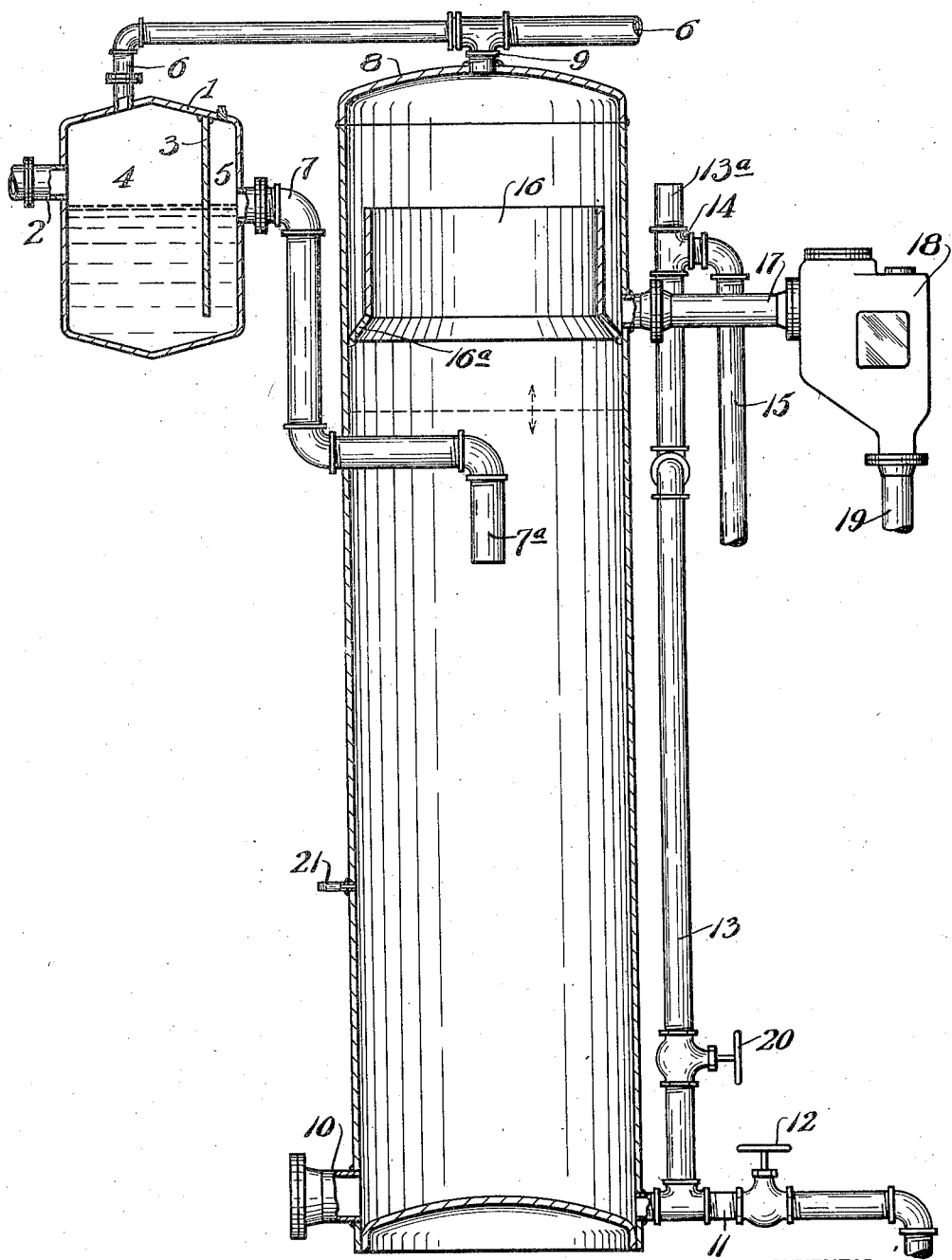

1,777,535

UNITED STATES PATENT OFFICE

CHARLES WALCOTT STRATFORD, OF SAN FRANCISCO, CALIFORNIA

DEVICE FOR SEPARATING LIQUIDS

Application filed November 4, 1927. Serial No. 231,155.

This invention relates to improvements in water distillate separators and refers more particularly to a device by means of which liquids of different gravities are separated.

Among the salient objects of the invention, are to provide: A system by means of which liquids of different gravity are separated or taken off in separate streams; to provide also, a mechanism for dividing liquids of different gravity which are in combination or heavily charged with gas or vapors, the gas and vapors producing continuous agitation and consequently, difficulties in the efficient separation of the liquids; to provide a mechanism and system of the character hereinafter described in more detail.

Referring to the drawings:

At 1 is shown a gas trap into which is connected a distillate supply line 2, within the gas trap is a partition 3, separating the trap and the separator compartments 4 and 5; into the top of the trap is connected a gas line 6, and into the opposite side of the trap from that into which the line 2 is connected is a withdrawal line 7 which communicates between the compartment 5 of the gas trap 1 and the separator 8. The pipe 7 terminates in an open-ended, downwardly projecting pipe 7ª within the tank. The separator consists of a shell having an upper gas relief line 9 which communicates with the pipe 6; near the bottom of the separator is a clean-out 10 closed by a removable plate and a water drain line 11 controlled by a valve 12; connected into the water drain by the valve 12 of the separator, is a stand pipe 13 which terminates at its upper end in an open-ended vent 13ª; near the top of the stand pipe is a T-connection 14 into which is connected the water overflow line 15 within the upper portion of the separator is positioned a weir or launder 16. This cylindrical element is somewhat less in diameter than the shell of the separator and is supported within the separator by the taper portion 16ª, which constitutes the lower portion of the launder and is connected by welding or otherwise fastened at its lower edge in a liquid-tight connection, with the inside surfaces of the separator.

It is essential that the T-connection 14 into which the water overflow line is connected, is positioned somewhat below the upper edge of the weir 16 in order that a proper separation is effected between the liquids of different gravity.

In operation the combined liquids containing gas or vapors, either in solution or intermixed with the liquid, are discharged into the gas trap through the pipe 2 and collect in the gas trap until they overflow through the line 7, the gas accumulating above the body of the liquid in the chamber 4, passes off through the pipe 6 and may be stored or used as desired. The accumulated liquid in the chamber 4 will rise to the same level in the compartment 5 and flow off through the line 7 to the separator.

By interposing a gas trap ahead of the separator in the position shown, gases and vapors contained in the liquids can more or less be eliminated before the liquid is introduced into the separator. This elimination of the gas and vapors from the liquid prior to the separation eliminates, to a great extent, the continual agitation or bubbling of the liquid body, which condition seriously hinders proper and efficient separation of the liquid.

The combined liquids introduced to the separator through the pipes 7 and 7ª accumulate in a relatively stagnant quiescent pool in the separator where due to the difference in gravity, there will be a distinct and sharp level of separation created.

The lighter liquid will rise above the heavier liquid until the former overflows the top edge of the weir 16, this liquid overflowing the weir is accumulated between the weir and the shell of the separator and directed off through the dry distillate draw-off line 17, passing through the look box 18 out through the line 19.

The liquid of heavier gravity flows into the stand pipe 13 and overflows through the line. In this operation the valve 12 is closed and the valve 20 in the line 13, is opened. The stand pipe 13 is vented at the top to permit the heavier liquid to overflow through the pipe 15

The line 11 is supplied to furnish a drain for the heavier liquid in case the separator is to be empty Any gas accumulating in the separator, passes off in the line 9 as combined with the connection from the trap 1. A water inlet pipe 21 is supplied in the side of the separator to load the separator in starting. The clean out 10 is used under circumstances where an accumulation of the material has built up on the bottom of the separator.

The advantageous features of the method will more or less, be obvious from the construction. The elimination of gas prior to the introduction of liquid to the separator, reducing materially the agitation created by the presence of this gas, and permits the accumulation of a body of liquid which is considerably more stagnant than were the gas present, thus materially increasing the efficiency of separation.

While this separator is particularly adapted for use in connection with the separation of water from hydrocarbon distillates in connection with the distillation of hydrocarbon oils or the cracking of hydrocarbons, the invention contemplates the separation of any liquids of different gravities in which gases or vapors are present.

The dotted line in the drawing shows the approximate level of the interface surface between the water and oil. This level will vary in height according to the different gravities of the oil which is being separated from the oil water distillate. In case of the separation of other liquids, the level may vary either up or down as shown by the double-headed arrow crossing the dotted line.

I claim as my invention:

A separator assembly for liquids of different gravities, comprising a container, water and gas outlets, a weir extending circumferentially of the container and inset from the shell thereof, forming an annular space between the weir and the container shell, a withdrawal line for removing liquid overflowing the top of the weir and accumulating in the annular space, a gas separating means for removing gas from the liquid prior to its introduction to the container, and a stand pipe on the bottom withdrawal line for simultaneously regulating the flow of liquid over the weir and determining the quantity of liquid taken off through the withdrawal line.

CHARLES WALCOTT STRATFORD.